UNITED STATES PATENT OFFICE.

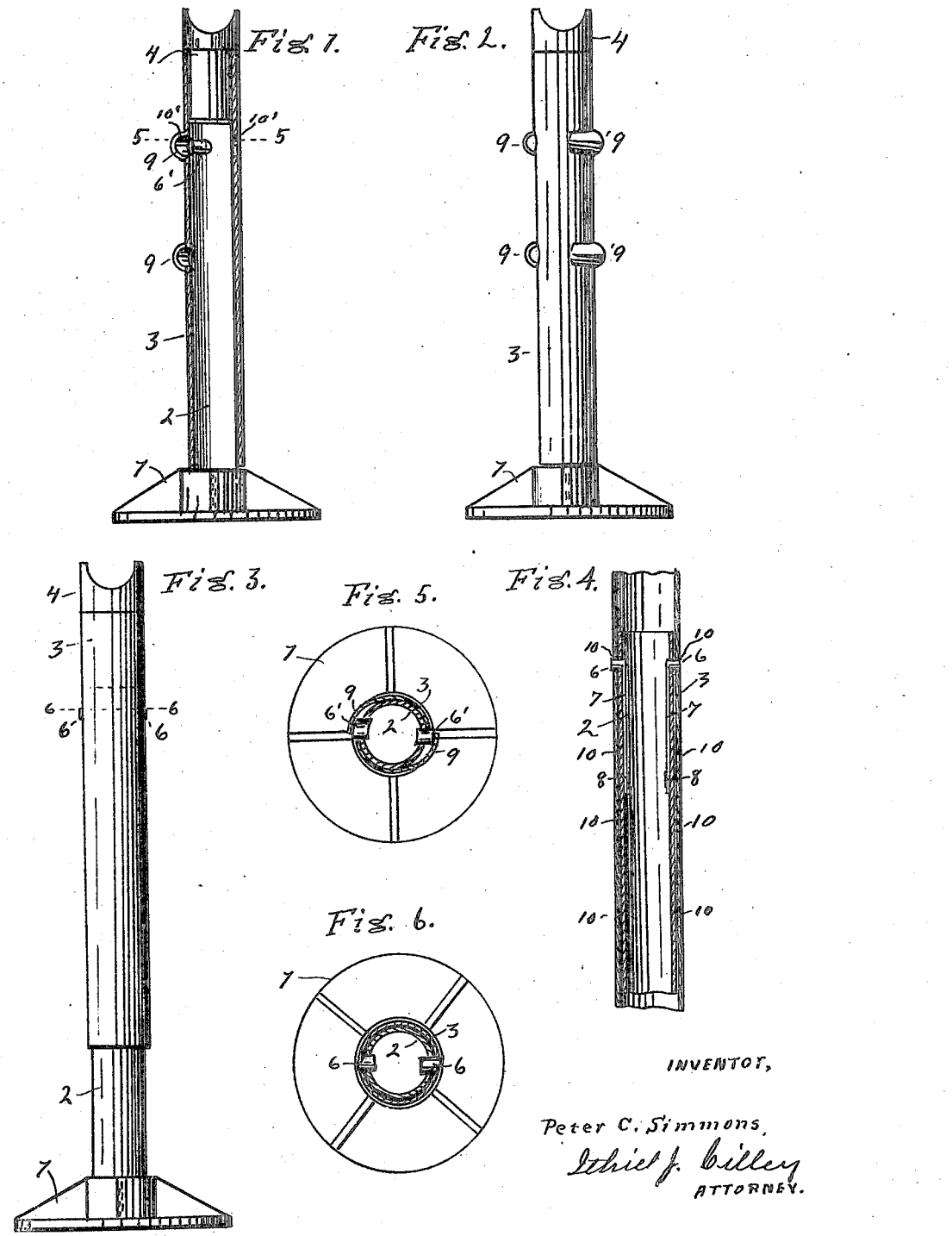

PETER C. SIMMONS, OF BUFFALO, MINNESOTA.

VEHICLE SUPPORT.

1,416,896.  Specification of Letters Patent.  Patented May 23, 1922.

Application filed December 18, 1920. Serial No. 431,728.

*To all whom it may concern:*

Be it known that I, PETER C. SIMMONS, a citizen of the United States, residing at Buffalo, in the county of Wright and State of Minnesota, have invented certain new and useful Improvements in Vehicle Supports, of which the following is a specification.

My invention relates to improvements in appliances for supporting heavy weights, as automobiles and other like vehicles, after they have been raised to desired position with a jack, or otherwise, and its objects are: first, to provide an implement of the kind mentioned that may be readily adjusted and secured in adjusted position; second, to provide an implement of the kind mentioned with which the supporting elements will work automatically by the simple turning of the extension part of the implement, and, third, to provide an implement of the kind mentioned that may be stored in small space, and will be at all times in readiness for use.

I attain these objects by the mechanism and construction of parts shown in the accompanying drawing, in which Fig. 1 is a sectional elevation of the extension element as mounted upon the supporting element. Fig. 2 is an elevation of one form of the implement, complete. Fig. 3 is an elevation of another form of the implement with the extensible element elevated. Fig. 4 is a sectional elevation of the supporting element and the extension element with the supporting springs and pins in place. Fig. 5 is a sectional plan of one form of implement on the line 5—5 of Fig. 1, and Fig. 6 is a like view of the other form of implement on the line 6—6 of Fig. 3.

Similar reference numerals indicate similar parts throughout the several views.

In the drawings 1 represents the base, which may be made of any desired form that will insure the desired effect. 2 represents the inner tube or supporting element of the implement. This element is securely mounted upon the base 1 and has two, or more, retaining pins, 6 or 6', as the case may be, that are mounted upon springs 7 and pass through openings in the sides of the element 2, and like openings in the extension element 3, which is provided with several openings, as indicated at 10, so the vertical position of the part 3 may be varied as the operator, or the conditions may require.

In the drawings I have shown two forms of elevator elements; the form shown in Figs. 1, 2 and 5 being provided with eccentrically formed inclines 9 designed to force the pins 6' backwardly into the standard 2 when the elevating element 3 is turned slightly to the right upon the standard, and thus relieve the elevating element to allow it to be raised or lowered, as may be. The pins 6' are made upon a sidewise angle at the ends, as indicated in Fig. 5 so that when the standard is made to revolve to the right the pin will be forced inwardly sufficiently to force them out of the openings 10' and allow the standard 3 to be manipulated as desired, as hereinbefore intimated.

In Figs. 3, 4 and 6 I have shown another form of standard with which the inclines 9 are dispensed with and the pins 6 are made with more of an incline upon the ends, as indicated in Fig. 6 so that the edges of the standard adjacent to the holes 10 will act to force the pins backwardly sufficiently to allow the standard to be released and moved upwardly or downwardly, as desired, with the same result described in connection with Figs. 1, 2 and 5.

The pins, in both instances, are, preferably, mounted upon, or are integral with the springs 7, which latter are secured to the element 2 as at 8, so that as soon as the standard 3 has been revolved into position to receive the pins 6 and 6', the pins will pass through the holes and hold the standard securely in place.

As it is necessary to provide some supporting element for the weight, at the upper end of the standard 2, which will permit the standard to be revolved as necessary, I have placed the caps 4 at the upper end of the standard, in such a manner as not to interfere with the free revoluble movement of the standard when desiring to move it upwardly or downwardly, or to lock it in any desired position.

Having thus fully described my invention, what I claim as new in the art, is:—

1. In an implement of the character named, a base, a tubular supporting standard mounted upon said base and having openings through its walls near the upper end, springs securely mounted within the standard, pins integral with the free ends of the springs in position to pass through the openings, a revoluble and slidable tubular standard mounted upon the supporting standard and having several shoulders formed in its walls to engage the pins when in proper positions, and to support the slidable standard and its load, and eccentrically formed walls adjacent to the shoulders whereby the revoluble movements of the outer standard will cause the pins to pass through the openings, or be forced out of them, as desired.

2. In a vehicle supporting implement, a base, a tubular standard securely mounted upon said base, springs mounted within the standard and having pins integral therewith arranged to extend beyond the periphery of the standard, a revoluble and slidable standard mounted outside of the supporting standard and having shoulders formed in its sides upon which the pins may be made to rest, eccentrically formed walls forming and covering said shoulders, and arranged to force the pins off of the shoulders when the outside standard is properly revolved, and a cap set into and revolubly mounted upon the outer standard.

Signed at Sanborn, North Dakota, November 20th, 1920.

PETER C. SIMMONS.